United States Patent [19]

Godfrey

[11] 4,021,594
[45] May 3, 1977

[54] POLYMER COATED REGENERATED CELLULOSE FILM CONTAINING CELLULOSE FIBERS IN THE COATING

[75] Inventor: John N. Godfrey, Asheville, N.C.

[73] Assignee: Olin Corporation, Pisgah Forest, N.C.

[22] Filed: Apr. 2, 1976

[21] Appl. No.: 673,266

[52] U.S. Cl. .................... 428/303; 260/17.4 CL; 428/326; 428/510; 428/536
[51] Int. Cl.² .................................. B32B 23/00
[58] Field of Search .......... 428/303, 326, 510, 534, 428/536; 106/193 R, 195; 260/17.4 CL

[56] References Cited

UNITED STATES PATENTS

| | | | |
|---|---|---|---|
| 3,251,817 | 5/1966 | Hahn et al. | 428/510 |
| 3,275,580 | 9/1966 | Battista | 428/510 |
| 3,276,899 | 10/1966 | Muhlberg et al. | 428/326 |
| 3,375,215 | 3/1968 | Kane | 428/510 |
| 3,402,062 | 9/1968 | Mohan | 428/510 |
| 3,476,587 | 11/1969 | Demol et al. | 428/510 |
| 3,592,725 | 7/1971 | Yoshimura et al. | 428/326 |

Primary Examiner—James J. Bell
Attorney, Agent, or Firm—Robert W. Habel

[57] ABSTRACT

The roll formation of polymer coated regenerated cellulose films is substantially improved by incorporating in polymer coatings for such films from 0.25 to 4% by weight, based upon the weight of the polymer coating, of finely divided cellulose fibers having an average particle fiber length within the range of from 10 to 150 microns.

5 Claims, No Drawings

POLYMER COATED REGENERATED CELLULOSE FILM CONTAINING CELLULOSE FIBERS IN THE COATING

BACKGROUND OF THE INVENTION

This invention relates generally to coated regenerated cellulose films and, more particularly, to coating compositions that significantly improve the roll formation of regenerated cellulose films.

A major problem associated with vinylidene chloride copolymer (saran) or nitrocellulose coated regenerated cellulose films is poor roll formation resulting in defective finished rolls of film. The defects are most noticeable when processing film of nonuniform thickness such as film having bands, stretched areas, and other gauge-related anomalies and those associated with the processing of a film of uniform thickness under less than ideal conditions; for example, as with excessive and/or nonuniform winding tensions and pressures causing variations in the hardness of the finished rolls. Heretofore, the problem of poor roll formation caused by gauge variations or nonuniform winding conditions has not been satisfactorily solved.

It is well known to improve the slip and blocking characteristics of vinylidene chloride copolymer coatings for regenerated cellulose films by incorporating in the coatings small amounts of finely divided, insoluble, inorganic matter such as bentonite clay, muscovite mica, steatite talc. The particle size of such materials usually falls within the range of 0.5 to 10 microns. Typical such coatings are disclosed in U.S. Pat. No. 3,428,483. While the above coatings improve the slip and blocking characteristics of the coated regenerated cellulose film, they have little, if any, effect upon roll formation.

It is also common practice to dust various film surfaces such as regenerated cellulose film with very fine particles of inorganic material such as talcum powder to overcome matting and slip deficiencies. Nevertheless, such dusting has little, if any, effect upon improving roll formation of the film. A similar technique is also disclosed in U.S. Pat. No. 2,057,548 wherein a comminuted material is applied to the surface of uncoated film to render the film surface less tacky. However, this type of surface application is not practical with coated films.

U.S. Pat. No. 2,909,449 discloses vinylidene chloride copolymer coating compositions to which has been added substantially amorphous vinylidene chloride copolymer particles in two different size ranges, the first from 0.05 to 0.5 microns and the second ranging in size from 2 to 65 microns. Films coated with such dispersions are stated to have a slightly roughened surface and excellent slip and substantially no blocking tendencies. While such coated films when wound into rolls might show some improved roll formation, the amorphous polyvinylidene chloride particles in the coating composition tend to soften in the solution, thereby diminishing the advantages of the particles on the surface of the film and simultaneously diminishing any improvement in roll formation that might be obtained from the larger particle sized materials.

It is also known from U.S. Pat. No. 3,592,725 to make the surface of synthetic resin films suitable for writing or printing by providing a visibly continuous layer of finely divided particles of clay, talc or cellulose pulp on the film, the particles being partially imbedded in the resin film by applying them when the film is in a softened or molten condition. While such surface treatments may be satisfactory with thermoplastic synthetic polymer films, they are not applicable to regenerated cellulose films, and, in any event, have no relation to the problems associated with polymer coatings of regenerated cellulose film.

SUMMARY OF THE INVENTION

Accordingly, it is an object of this invention to improve the roll formation of polymer coated regenerated cellulose film. Another object of this invention is to provide a polymer coated regenerated cellulose film in which the coating composition minimizes processing deficiencies and defects in the film to improve roll formation. A specific object of the invention is to provide an additive for conventional vinylidene chloride copolymer or nitrocellulose coatings for regenerated cellulose film to improve roll formation in finished rolls of the coated regenerated cellulose film.

Surprisingly, we have found that the roll formation of polymer coated regenerated cellulose films can be substantially improved by incorporating in the polymer coatings for such films from 0.25 to 4% by weight, based upon the weight of the polymer coating, of finely divided cellulose fibers having an average particle fiber length within the range of from 10 to 150 microns. The benefits obtained by the inclusion of such cellulose fibers in the coating of regenerated cellulose are realized because irregular asperities are formed on the surface of the cellophane sheet by the particles. These asperities serve to prevent adjacent sheets of cellophane, such as successive layers in a roll, from coming in full contact with one another and allow a layer of air to remain as a discreet separator of the film layers as the roll is wound. Moreover, the inherent cushioning effect of the fibers themselves prevents damage to opposed film surfaces despite the large particles used. Thus, in accordance with this invention, regenerated cellulose film is provided with a built-in capability of resisting defect formation such as those associated with the processing of a film of nonuniform thickness or those associated with the processing of a film of uniform thickness under less than ideal conditions where excessive or nonuniform winding tensions and pressures result in significant variation in the hardness of the finished rolls.

Roll formation of the coated regenerated cellulose film is dramatically improved when the fibrous cellulose particles are incorporated in any of the conventional polymer coating compositions for regenerated cellulose film, particularly the commonly used vinylidene chloride copolymer compositions and the nitrocellulose coating compositions. Cellulose fibers incorporated in such coating compositions have a unique compatibility with the coated regenerated cellulose film since the uncoated base sheet is regenerated cellulose, and the particles utilized as an additive in the coating will have characteristics similar to the base sheet. These characteristics are particularly important when such properties of the coating additive as index of refraction, film clarity, chemical reactivity, coating adhesion, bioacceptability, and density are considered. Use of cellulose fiber as a coating additive to perform a special function with a base sheet composed of regenerated cellulose negates many of the usual problems associated with larger particle size materials as coating additives. This is especially true with large particle size inorganic materials because not only are they incompatible with the cellulose film from the standpoint of physical and chemical properties, but, in addition, they have the disadvantage of tending to settle out of the coating bath because of their high density. None of these problems occur when relatively large particle fiber length cellulose fiber is incorporated in the coating according to the present invention.

Any relatively pure comminuted cellulose fiber material having an average particle fiber length within the range of from 10 to 150 microns can be used as the additive in the coating formulation. A convenient source of cellulose fibers are the various Solka Floc natural cellulose fiber materials manufactured by Brown Company of 555 Fifth Avenue, New York. Such fiber materials are composed of pure, white, finely divided fragments of natural cellulose fiber made from purified wood pulp. In the dry state, they comprise at least 99.5% cellulose and are virtually lignin free.

The cellulose fibers can be incorporated in any of the commonly used vinylidene chloride copolymer or nitrocellulose coating compositions. Representative examples of vinylidene chloride copolymers used for coatings and specific coating compositions are disclosed in U.S. Pat. No. 3,428,483. Typical nitrocellulose coating compositions are disclosed in U.S. Pat. Nos. 1,737,187 and 2,079,379.

In order to achieve the desired improvement in roll formation, the amount of cellulose fiber incorporated in the coating should be at least 0.25% by weight, based on the weight of the coating. Amounts less than 0.25% are ineffective and amounts greater than 4% by weight are undesirable since at higher levels of addition the coated film tends to develop haze or blush. Preferably, the coating should contain from 0.5 to 2% by weight cellulose fiber based on the weight of the coating. Other properties of the coated film, such as heat sealability, vapor permeability, slip and blocking, are not affected by the cellulose fiber addition. Conventional slip and antiblocking agents such as finely pulverized (less than 10 microns) talc, mica or clay, may be used in the coating composition without diminishing the roll formation improvements obtained from cellulose fiber additive according to the invention. Thorough dispersion of the cellulose fibers in the coating formulation should be obtained by rapid mixing or other conventional means to prevent any agglomeration of the fibers and assure even distribution thereof throughout the coating when applied to the base film. Coating formulations containing the cellulose fibers can be applied to the base film using doctor rolls or any other conventional applicating technique.

PREFERRED EMBODIMENTS

The following examples will serve to further illustrate the invention.

EXAMPLE I

Regenerated cellulose base sheet (160 gauge, approximate thickness 0.0013) was coated with a vinylidene chloride based copolymer and additives constituting 18% solids by weight of the coating bath using a tetrahydrofuran/toluene mixture as solvent. A second coating bath identical to the first except that 3% of the solids were cellulose particles, replacing an equal weight of polymer, was utilized to coat another sample of the same cellophane base sheet. The cellulose particles used in the second bath had an average particle fiber length of from 50 to 60 microns. Such fibers are sold commercially as Solka Floc BW-40 by Brown Company of New York. As each coated roll of film was wound up, cardboard strips having dimensions of 10 × 0.5 × 0.025 were inserted into the rolls between layers of film to simulate an extreme variation in film gauge. Equal amounts of film were then wound on top of the inserted cardboard strips on each roll. The roll of film not containing the cellulose fiber particles had a much harder band caused by the cardboard strips than did the roll of film containing the cellulose particles. When both rolls were unwound down to the area where the strips had been inserted, the roll without cellulose particles was severely marked by clear dark areas indicative of close contact by successive layers of film and Newton's rings (characteristic of a liquid layer) were observed between the film layers. On the other hand, the roll containing cellulose particles was only slightly marked by the defects characteristic of close contact by successive layers of film.

Both rolls were then rewound and cardboard strips were again inserted into the rolls. Each roll was subjected to a pressure of approximately 88 pounds per square inch. The surface appearance of the rolls in the area above the cardboard strips was examined. The roll without cellulose fiber particles once again was severely marked by clear dark areas, whereas the roll containing cellulose particles was only slightly marked. As the foregoing clearly demonstrates, the inclusion of cellulose fiber particles in the coating significantly improves the roll formation by minimizing the effects from defects found in film which limit the usefulness thereof.

EXAMPLE II

The same experiments as previously described in Example I were repeated except that coating baths containing 21% solids by weight were utilized. Comparative tests were run using 0.5%, 1%, 2% and 3% substituted cellulose fibers for the solids in the coating bath. In separate samples the average particle fiber length was 15 to 35 microns, 30 to 35 microns, 35 to 45 microns, 50 to 60 microns, and 80 to 120 microns. In every comparative test, the coated film not containing cellulose particles had more severe roll formation defects than did the film containing cellulose fiber particles.

As the foregoing specific examples show, the inclusion of fairly large size cellulose fiber particles in polymer coatings for regenerated cellulose film significantly improves roll formation. Although the present invention has been described in conjunction with the preferred embodiments, the examples and description are only illustrative of the invention and it is to be understood that there are many variations and modifications that may be resorted to without departing from the spirit or scope of the invention, as those skilled in the art will readily understand.

What is claimed is:

1. In a regenerated cellulose film coated on at least one surface with a continuous polymer coating composition selected from the group consisting of vinylidene chloride coating compositions and nitrocellulose coating compositions, the improvement comprising evenly distributing in the coating composition from 0.25 to 4% by weight, based on the weight of the coating, of cellulose fiber having an average particle fiber length within the range of from 10 to 150 microns.

2. The regenerated cellulose film of claim 1 in which the cellulose fiber is comprised of pure, white, finely divided fragments of natural cellulose fiber that is substantially lignin free.

3. The regenerated cellulose film of claim 1 in which the amount of cellulose fiber incorporated in the coating composition is from 0.5 to 2% by weight, based on the weight of the coating composition.

4. A method of improving the roll formation of regenerated cellulose films comprising coating at least one surface of the film with a continuous coating composition selected from the group consisiting of vinylidene chloride copolymer coating compositions and nitrocellulose coating compositions, said coating compositions containing an even distribution of from 0.25 to 4% by weight, based on the weight of the coating composition, of finely divided cellulose fiber having an average particle fiber length within the range of from 10 to 150 microns.

5. The method of claim 4 in which the coating composition contains from 0.5 to 2% by weight cellulose fiber, based on the weight of the coating composition.

* * * * *